United States Patent

[11] 3,585,432

[72] Inventor Albert E. Oberg
 Horseheads, N.Y.
[21] Appl. No. 782,598
[22] Filed Dec. 10, 1968
[45] Patented June 15, 1971
[73] Assignee Westinghouse Electric Corporation
 Pittsburgh, Pa.

[54] FACEPLATE MEANS FOR IMPROVING DIELECTRIC STRENGTH OF CATHODE-RAY TUBES
 3 Claims, 4 Drawing Figs.
[52] U.S. Cl..................................................... 313/92LF, 178/7.85
[51] Int. Cl....................................................... H01j 29/18

[50] Field of Search............................................ 178/7.85; 313/92 LF; 346/110

[56] References Cited
UNITED STATES PATENTS
3,043,179 7/1962 Dunn............................. 178/7.85 X
3,043,910 7/1962 Hicks, Jr....................... 178/7.85

*Primary Examiner*—Raymond F. Hossfeld
*Attorneys*—F. H. Henson, C. F. Renz and M. P. Lynch ABSTRACT: The invention is a multiple element faceplate assembly for cathode-ray tubes for increasing the dielectric strength of the faceplate and thereby eliminate voltage breakdown across the faceplate. A second faceplate is coupled to the fiber optic faceplate of a cathode-ray tube to compensate for flaws in the fiber optic faceplate which reduce the dielectric strength between surfaces of the fiber optic faceplate.

PATENTED JUN 15 1971

3,585,432

WITNESSES:
Leon M. Garman
Michael P. Lynch

INVENTOR
Albert E. Oberg
BY
ATTORNEY

FACEPLATE MEANS FOR IMPROVING DIELECTRIC STRENGTH OF CATHODE-RAY TUBES

BACKGROUND OF THE INVENTION

1. Field of the Invention

The invention relates in general to cathode ray tube faceplate structures and more particularly to means for improving the dielectric strength thereof.

2. Description of the Prior Art

In cathode-ray tubes, problems of deflection defocusing and deflection nonlinearity can be greatly reduced by use of a nonplanar phosphor screen whose center of curvature is the center of deflection of the electron beam. The use of fiber optic faceplates has made possible the use of such a screen while still providing a flat viewing surface.

Furthermore the fiber optic faceplate exhibits image transfer characteristics far superior to that of ordinary glass panels and therefore is used extensively in cathode-ray tubes for direct contact printing of trace information on film.

The glass fibers of the fiber optic faceplate are of high index transparent glass and are individually coated and separated from one another by a low index glass. Close bundling of the fibers in a parallel relationship produces a faceplate which exhibits a high dielectric strength between the faceplate surfaces. Due to the many thousands of fibers present in the faceplate this ideal parallel relationship cannot be uniformly maintained. A nonparallel relationship between adjacent fibers or an excessive separation between these fibers will result in either the presence of voids in the surface of the faceplate or the presence of an excess quantity of sealing glass, either of which reduces the dielectric strength of the faceplate at this location.

In cathode-ray tubes wherein an electrically conductive coating is applied to a phosphor screen which is in contact with the faceplate, a very high electrical gradient is established across the faceplate. The electrical gradient results from the application of a high electrical potential, typically 16 kv., to the electrical coating and a zero electrical potential existing on the metal support structure in contact with the exterior surface of the faceplate. In the application of the fiber optic tube for direct contact printing of film, the film guide, which is maintained at a spacing of a few thousandths of an inch from the exterior faceplate surface represents an additional electrical conductor at zero electrical potential. The presence of such a high electrical gradient across a fiber optic faceplate will likely result in electrical breakdown at an area of low dielectric strength. The electrical breakdown results in potential puncture of the faceplate, damage to the tube phosphor and loss of vacuum. Furthermore the surge of current through the faceplate resulting from the voltage breakdown across the faceplate presents a serious hazard to personnel in contact with the faceplate.

The application of thin films of glass commonly used to seal fiber optic faceplates does not provide the increased dielectric strength required to minimize high voltage electrical breakdown.

SUMMARY

The invention is a cathode-ray tube employing a second faceplate maintained in contact with the fiber optic faceplate of a cathode-ray tube by suitable bonding or mechanical means to eliminate faceplate failure due to high voltage electrical breakdown.

The addition of a second faceplate of either a fiber optic or glass construction, depending on the application of the cathode-ray tube, eliminates high voltage breakdown due to the improbability of areas of low dielectric strength of the plates coinciding exactly.

The plate glass secondary plate is utilized in applications where a lens system is used to focus a beam on a remote target.

The fiber optic secondary faceplate is used in applications requiring direct contact of the target with the faceplate such as direct contact recording of trace information on film.

DESCRIPTION OF THE PREFERRED EMBODIMENT

Figure 1:
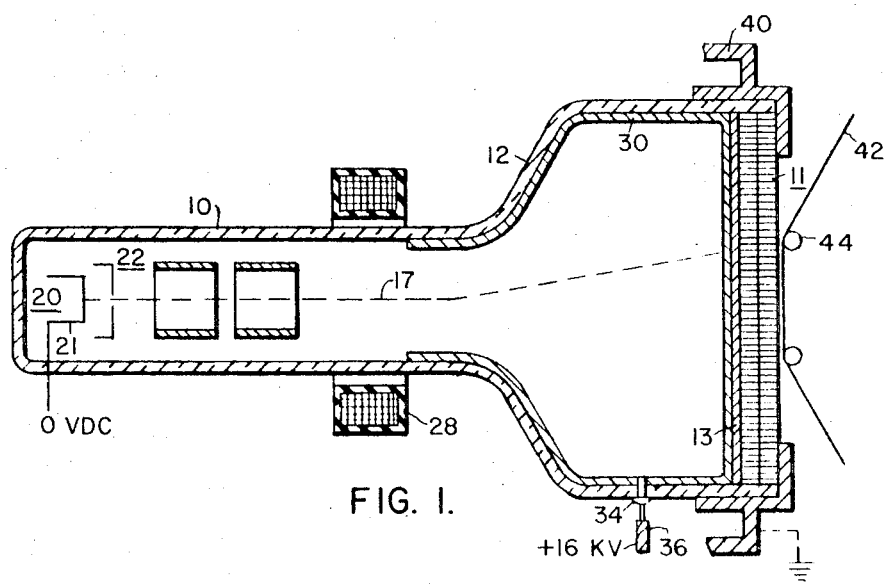
FIG. 1. is a schematic view of a typical embodiment of the invention.

Referring to FIG. 1, a cathode ray tube 1 is shown comprising a neck portion 10 having a faceplate 11 interconnected by cone 12. The faceplate 11 has a phosphor screen 13 in the form of a material layer formed thereon which is excited upon impingement of the electron beam 17 originating from the gun structure 20. The gun structure 20 is located within the neck portion 10 and is comprised of a cathode 21 and multiple grids 22 which control, accelerate, and focus electrons from the cathode 21 into the beam 17 directed toward and convergent at the phosphor screen 13. Coils 28 direct the electron beam 17 onto a prescribed spot on the phosphor screen 13.

In accordance with standard practice in the fabrication of cathode ray tubes a conductive coating 30 of a material such as aluminum is applied to the phosphor screen surface remote from the faceplate 11 and is applied continuously to the internal surface of the cone 12 and extends into the neck portion 10. The conductive coating in addition to improving brightness and eliminating spot motion due to screen charging, provides an electrically field free space between the gun structure 20 and the screen 13.

In operations of conventional cathode-ray tubes it is customary to maintain the phosphor screen at a high positive DC voltage level in comparison to the cathode 21. For convenience it is customary to maintain the cathode 21 and control grids 22 at or near ground potential with the screen 13 at a positive potential which may range from a few kv. to 30 kv. or more. As illustrated in FIG. 1, the conductive coating 30 is connected to a direct current high voltage source, typically 16 kv., through the high voltage terminal 34 and the cable 36.

The cathode-ray tube is mounted in a suitable frame structure 40.

The structure and arrangement of components described thus far is typical for cathode-ray tube systems and is merely representative of such systems.

The development of fiber optic technology has resulted in the application of fiber optics to tubes, such as cathode-ray tubes, in the form of improved faceplate structures.

The fiber optic faceplate may be formed by the use of a multiple fiber optical image transfer assembly or bundle in which each of the many fine fibers thereof are of high index transparent glass and are individually coated and separated from one another by a low index glass. This low index glass serves as optical insulation and insures good total internal reflecting characteristics insofar as the light traveling from one end of each fiber to the other is concerned. The nearly parallel relationship of the individual coated light conducting fibers in the fiber optic faceplate produces an integral unitary optical image transfer from the surface of the faceplate 11 in contact with the phosphor screen 13 to the exterior surface of the faceplate 11. The fiber optic faceplate therefore eliminates the diffusion of light and loss of contrast experienced in plate glass faceplates.

The fiber sizes are selected in accordance with the degree of resolution desired of the image which is to be transferred through the faceplate. Within practical limits smaller fibers in greater numbers provide higher degrees of image resolution.

Due to the image transfer characteristics of the fiber optic faceplate, fiber optic faceplates have found considerable application in display devices for direct contact photographic printing of trace information.

An illustration of this application is depicted in FIG. 1 wherein the film 42 is brought in contact with faceplate 11 by the film guides 44.

While the fiber optic faceplate exhibits desirable optical characteristics the structure of the fiber optic faceplate as used in conventional cathode-ray tubes cannot be depended upon to withstand the high potential gradient established between the conductive surface 30, which may range from a few kv. to 30 kv. or more, and the exterior surface of the tube which is at zero volts.

In the ideal fiber optic faceplate, wherein the individual fibers are substantially parallel to one another the dielectric strength exhibited between the surfaces of the faceplate is high, typically millions of volts per centimeter and as such prevents voltage breakdown across the fiber plate due to the high potential gradient.

Figure 2:
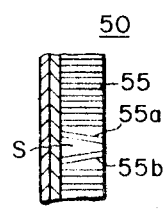
FIG. 2 is a partial view in section of a single fiber optic faceplate.

Generally, however, the alignment of the fibers is not uniformly parallel and is more nearly represented by the fiber optic faceplate illustrated in FIG. 2. The faceplate 50 is comprised of fibers 55 of which fibers 55A and 55B represent nonparallel adjacent fibers. The crevice S created by the nonparallel relationship of the fibers 55A and 55B represents a void in the faceplate surface or the presence of the low dielectric insulating glass either of which reduces the effective dielectric strength of the plate 50 at the location S. This reduction in dielectric strength could result in a voltage breakdown occurring through the fiber optic faceplate 50 at location S between the conductive coating 30 and the mounting frame 40 or the film guides 44; the mounting frame 40 and the film guides 44 representing electrical conductors.

Figure 3:
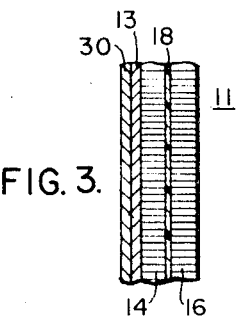
FIG. 3 is a partial view in section of an embodiment of the invention.

In FIG. 3 there is illustrated a detailed section of the faceplate 11 of the cathode-ray tube of FIG. 1. In addition to the fiber optic plate 14, the associated phosphor screen 13 and the conductive layer 30 there is provided a second fiber optic faceplate 16 which is bonded to plate 14 by a suitable optical cement 18. The second fiber optic plate 16, in addition to maintaining the desired image transfer quality of fiber optics, eliminates voltage breakdown across the faceplate structure 11 by eliminating the adverse affects of the fiber misalignment illustrated in FIG. 2. The second fiber optic faceplate 16 acts as a second dielectric element and provides adequate additional dielectric strength at the low dielectric strength location S of plate 14 to prevent voltage breakdown through faceplate 11. While it is acknowledged that misalignment of fibers in plate 16 can exist, the probability of the fiber optic plates 14 and 16 being positioned so as to align the low dielectric strength locations of the respective plates is extremely remote due to the thousands of fibers which are present in each fiber optic plate.

The application of the second fiber optic plate 16 reduces the requirement for close control of the bundling of the fibers and therefore improves the yield of acceptable fiber optic tubes.

While the second fiber plate 16 is shown as being bonded to the fiber plate 14, it is obvious that fiber plate 16 could be mechanically secured to fiber plate 14 by a suitable means (not shown). This method of establishing intimate contact between plates 14 and 16 would permit replacing the second fiber plate in the event of damage or excessive wear.

Figure 4:
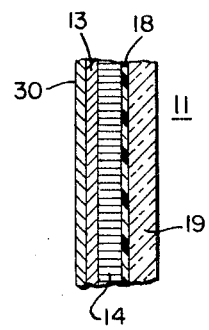
FIG. 4 is a partial view in section of an alternate embodiment.

In those applications where direct contact with the fiber optic faceplate is not required, a glass panel 19 of any desired optical quality, transmission level, color or surface treatment can be bonded to fiber optic plate 14 to provide the same protection as that provided by fiber optic plate 16 as illustrated in FIG. 4.

Proper choice of a means for joining the second faceplate to the fiber optic faceplate of the cathode-ray tube will permit the removal of the second faceplate and replacement thereof for maintenance reasons or to provide the capability of changing the characteristics of the cathode-ray tube faceplate.

Various modifications may be made within the spirit of the invention.

I claim:

1. In combination a cathode-ray tube display system having a faceplate assembly comprising,
    a first faceplate of the fiber optic type, said faceplate-type exhibiting random areas of low dielectric strength between the surfaces thereof,
    a phosphor screen located on the interior surface of said first faceplate,
    an electrically conductive coating on the phosphor screen remote from the interior surface of said first faceplate,
    a second faceplate means for maintaining contact between a surface of said second faceplate and the exterior surface of said first faceplate to form said faceplate assembly, said faceplate assembly exhibiting greater dielectric strength than that of said first faceplate, and
    a second electrically conductive means associated with the surface of said second faceplate remote from said first faceplate, and means for maintaining said electrically conductive coating at a high electrical potential with respect to said second electrically conductive means to establish a potential gradient therebetween, said faceplate assembly exhibiting sufficiently high dielectric strength to substantially eliminate high voltage electrical breakdown between the remote surfaces of said faceplate assembly.

2. In combination as claimed in claim 1 wherein said second faceplate is of the fiber optic type.

3. In combination as claimed in claim 1 wherein said second faceplate is a glass panel.